(No Model.)

G. H. PAINE.
PIPE VISE.

No. 346,496. Patented Aug. 3, 1886.

UNITED STATES PATENT OFFICE.

GEORGE H. PAINE, OF PHILADELPHIA, PENNSYLVANIA.

PIPE-VISE.

SPECIFICATION forming part of Letters Patent No. 346,496, dated August 3, 1886.

Application filed June 3, 1886. Serial No. 204,006. (No model.)

*To all whom it may concern:*

Be it known that I, GEORGE H. PAINE, of the city and county of Philadelphia, and State of Pennsylvania, have invented an Improvement in Pipe-Vises, of which the following is a specification.

My invention has reference to pipe-vises; and it consists in certain improvements, all of which are fully set forth in the following specification, and shown in the accompanying drawings which form part thereof.

The general principle involved in a vise such as herein set forth is shown and claimed in Letters Patent No. 328,102, and dated October 13, 1885, upon which the invention set out in this application is an improvement.

The essential features of the invention consist in connecting the two hinged gripping-jaws so that when one is moved the other is moved also, said improvement facilitating the opening of the jaws, allowing the pipe to be inserted with one hand, while both the jaws are readily opened with the other. A further feature in this construction consists in combining with the above one or more springs, the function of which springs is to cause the jaws to close down upon the pipe inserted in the vise, thereby normally tending to make the said jaws grip whatever is placed under them and insure a more positive hold upon the said pipe. To insure the pipe being strongly gripped without relying upon its being turned to produce the proper gripping action, I provide a movable clamp and suitable device to move it, whereby, after the pipe has been inserted in the jaws, the clamp may be moved to force the pipe snugly against the teeth of the jaws, thereby more positively securing the pipe in position and placing it in readiness to have a screw-thread cut upon it or a section cut off. These features are the essentials of the invention, and while I have shown a suitable construction involving them, it is to be understood that it may be modified or varied without in any wise departing from the spirit of the invention.

Figure 1:
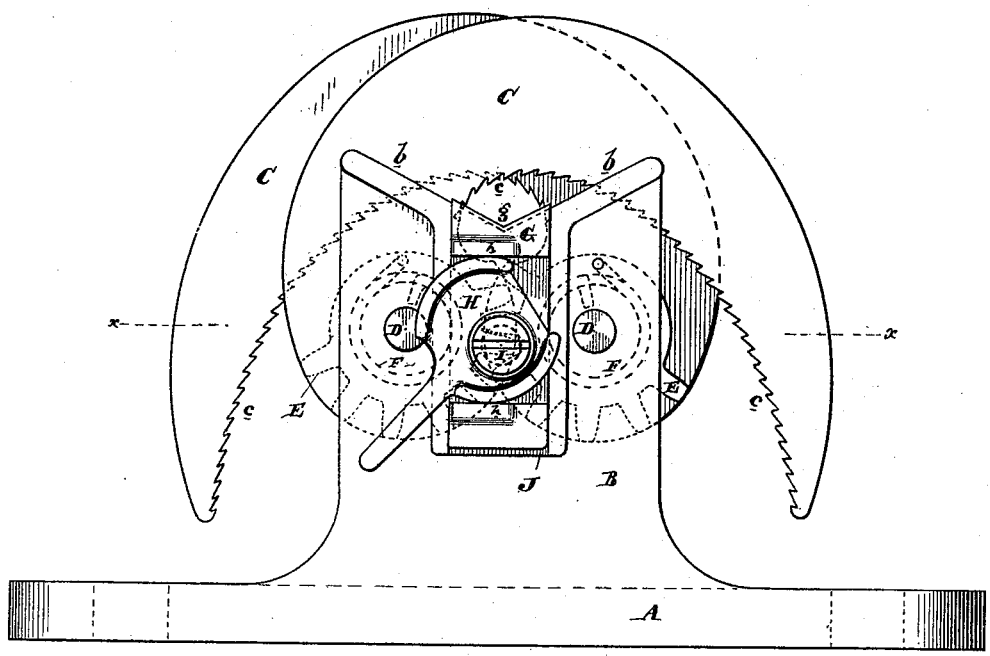
Figure 2:
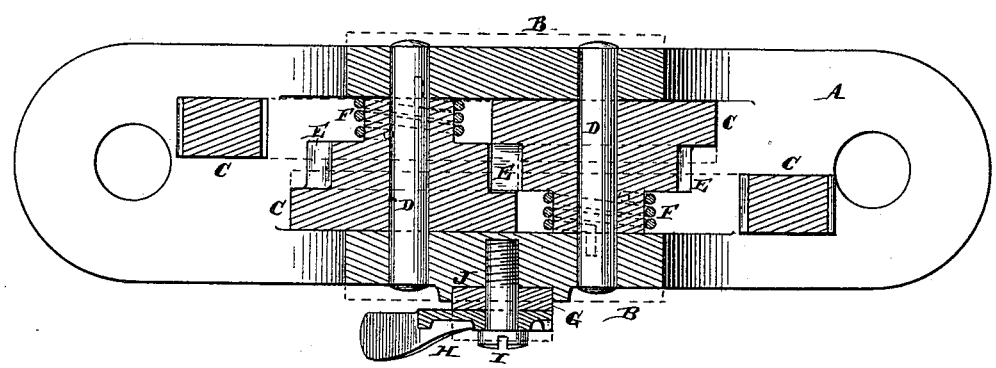

In the drawings, Figure 1 is a side elevation of a pipe-vise embodying my improvements, and Fig. 2 is a cross-section of same on line *x x*.

A is the base-plate, and has the two uprights B B, between which the jaws C C are journaled by pins D. These jaws C are made like an Archimedean spiral, the gripping-surfaces thereof being provided with teeth *c*. These jaws C point in opposite directions, and are arranged side by side, so that the teeth thereof point in opposite directions, also thereby enabling the pipe to be firmly held, irrespective of the direction in which it may be turned. The upper edges of the uprights B are made V-shaped, as at *b*, so as to center the pipe and form a support therefor directly under cross-line of the gripping-teeth *c*. The jaws C are connected together by gearing E or other mechanical equivalent, whereby when one jaw is raised the other jaw is raised also. To insure these jaws closing down upon the pipe placed in the V-support B, I provide one or more springs, F, preferably surrounding the hubs of the jaws, as shown.

G is a small clamp-slide having a V-shaped groove, *g*, at its upper edge, and is adapted to press upward against the under part of the pipe. This clamp G is adapted to slide in a groove or guide, J, upon one of the uprights B. If desired, there may be two sets of such clamps, one upon each of the uprights. This clamp may be operated by a cam, H, journaled at I by a screw, which also holds the clamp G in its groove, and this cam works against faces *h* upon said clamp. It is self-evident that in place of the cam either of its mechanical equivalents, the screw or wedge, may be used, as the essential feature is simply to provide a movable clamp which shall force the pipe up into the jaws C.

In use the jaws C are thrown open till the pipe is inserted. They are then liberated, and close down upon the said pipe through the mediation of the springs. The clamp is then raised, and the pipe will be found to be firmly gripped and free from any slippage.

Having now described my invention, what I claim as new, and desire to secure by Letters Patent, is—

1. A pipe-vise consisting of a frame, in combination with two hinged grip-jaws connected together, whereby when one jaw is raised the other is raised also, and one or more springs to rotate said jaws in opposite directions, substantially as and for the purpose specified.

2. A pipe-vise consisting of a frame, in combination with two hinged gripping-jaws and connecting devices, substantially as set forth, whereby when one of said jaws is raised the other is raised also, and vice versa, substantially as and for the purpose specified.

3. A pipe-vise consisting of a frame, in combination with two hinged gripping-jaws and connecting gearing, whereby when one of said jaws is raised the other is raised also, and vice versa, substantially as and for the purpose specified.

4. A pipe-vise consisting of a frame, in combination with two hinged gripping-jaws and connecting gearing, whereby when one of said jaws is raised the other is raised also, and vice versa, and springs to normally force said jaws toward each other, as in the act of gripping the pipe, substantially as and for the purpose specified.

5. A pipe-vise consisting of a frame, in combination with two hinged gripping-jaws and connecting gearing, whereby when one of said jaws is raised the other is raised also, and vice versa, springs to normally force said jaws toward each other as in the act of gripping the pipe, and an adjustable clamp to force the pipe into the jaws, substantially as and for the purpose specified.

6. A pipe-vise consisting of a frame, in combination with two hinged gripping-jaws, one or more springs to rotate said jaws in opposite directions, and an adjustable clamp to force the pipe into the jaws, substantially as and for the purpose specified.

7. A pipe-vise consisting of a frame, in combination with two hinged gripping-jaws connected together, whereby when one jaw is raised the other is raised also, one or more springs to rotate said jaws in opposite directions, and an adjustable clamp to force the pipe into the jaws, substantially as and for the purpose specified.

8. A pipe-vise consisting of a frame, in combination with two hinged jaws having serrated or toothed gripping-faces, and an adjustable clamp to force the pipe into said jaws, substantially as and for the purpose specified.

9. A pipe-vise consisting of a frame, in combination with two hinged jaws having serrated or toothed gripping-faces, and an adjustable clamp to force the pipe into said jaws, and a cam to operate said clamp, substantially as and for the purpose specified.

10. The combination of the frame A B, the hinged jaws C C, having teeth $c$, and gears E, by which said jaws are connected, substantially as and for the purpose specified.

11. The combination of the frame A B, the hinged jaws C C, having teeth $c$, gears E, by which said jaws are connected, and springs F to cause said jaws to rotate to approach each other, substantially as and for the purpose specified.

12. The combination of frame A B, the hinged jaws C C, having teeth $c$, and adjustable clamp G, substantially as and for the purpose specified.

13. The combination of the frame A B, the hinged jaws C C, having teeth $c$, adjustable clamp G, and cam H to operate said clamp, substantially as and for the purpose specified.

In testimony of which invention I hereunto set my hand.

GEORGE H. PAINE.

Witnesses:
R. M. HUNTER,
E. M. BRECKINREED.